United States Patent [19]

Weber

[11] 4,346,479

[45] Aug. 24, 1982

[54] COMPENSATION FOR TRANSMISSION ELEMENT NONLINEARITIES IN A RADIO RELAY TRANSMISSION SYSTEM

[75] Inventor: Herbert Weber, Backnang, Fed. Rep. of Germany

[73] Assignee: Licentia Patent-Verwaltungs-GmbH, Frankfurt am Main, Fed. Rep. of Germany

[21] Appl. No.: 157,172

[22] Filed: Jun. 6, 1980

[30] Foreign Application Priority Data

Jun. 7, 1979 [DE] Fed. Rep. of Germany ....... 2923046

[51] Int. Cl.³ .................... H04B 1/66; H04B 15/00
[52] U.S. Cl. ...................................... 455/22; 455/20; 455/313; 328/158; 328/162; 328/165; 332/37 R
[58] Field of Search ............... 455/22, 20, 21, 102, 455/103, 105, 118, 313, 314, 323; 332/41, 48, 37 R; 328/155, 162, 165, 133, 134, 142, 158

[56] References Cited

U.S. PATENT DOCUMENTS

| | | | |
|---|---|---|---|
| 2,279,177 | 4/1942 | Plebanski | 455/313 |
| 2,405,765 | 8/1946 | Smith | 455/22 |
| 2,705,775 | 4/1955 | Crosby | 332/37 R |
| 3,528,037 | 9/1970 | Yamazaki | 332/37 R |

FOREIGN PATENT DOCUMENTS 2743352  3/1979  Fed. Rep. of Germany ........ 455/22

Primary Examiner—Thomas A. Robinson
Assistant Examiner—Donnie L. Crosland
Attorney, Agent, or Firm—Spencer & Kaye

[57] ABSTRACT

In order to compensate for nonlinearities introduced by a transmission member in a radio relay transmission system by means of a distortion converter stage, the converter stage is supplied with an intermediate frequency signal modulated with the useful signal, and with a local oscillator signal, a desired high frequency signal with its desired level is provided by a first mixing diode included in a first converter, a desired high frequency signal with a level below its desired level and with a phase shift is provided by a second mixing diode included in a second converter, the two high frequency signals are combined in a summing member, and the high frequency signal provided by the second converter is set by a level and phase controller so that the combined high frequency output signal has a distorted component whose amplitude coincides with the amplitude of the distorted signal component introduced by the transmission member but whose phase is in phase opposition with the latter.

5 Claims, 4 Drawing Figures

COMPENSATION FOR TRANSMISSION ELEMENT NONLINEARITIES IN A RADIO RELAY TRANSMISSION SYSTEM

BACKGROUND OF THE INVENTION

The present invention relates to a method and converter arrangement for compensating nonlinearities introduced by transmission members in a radio relay transmission system.

A previously proposed system of this type which provides nonlinearity compensation is described in Federal Republic of Germany Application De. No. 27 43 352. This system includes a harmonic generator converter stage to which is fed an intermediate frequency signal (ZF) modulated with the useful signal and a local oscillator signal. The stage includes a first converter diode setting the high frequency (HF) signal with its desired level, a second converter diode setting the HF signal below its desired level and with a shift in phase, and means linking the two HF signals with the setting being selected in such a manner that the linked high frequency output signal has a distorted component whose amplitude coincides with the amplitude of the distorted signal component created by a transmission member but whose phase is in phase opposition to the latter.

The purpose of the previously proposed system is to compensate for the nonlinearity introduced by the transmission member by suitably dimensioning a converter. To this end, a variable series circuit tuned to the oscillator frequency and including an inductance, a capacitance and a resistor is provided for changing the level and phase of the oscillator signal.

A drawback of this approach, however, is that the series circuit will have to be retuned upon each change in frequency and the phase position of the generated nonlinearity is limited to a range from $-\pi/4 < \omega < \pi/4$.

SUMMARY OF THE INVENTION

It is an object of the present invention to permit compensation for nonlinearities of any amplitude and any phase in the transmission members of a radio relay transmission system even with broadband operation. Although it is indicated, at the bottom of page 6 to the top of page 7 of the above-mentioned German Offenlegungsschrift, that a corresponding circuit can also be realized broadbandedly with two mixer stages and suitable interconnections, the phase position of the second mixer stage being set by means of a circulator, attenuating member and a stub line, no definite, clear teaching is given for the solution of the problem on which the present invention is based.

The above and other objects are achieved, according to the invention, in a method and circuit for compensating for nonlinearities introduced by a transmission member in a radio relay transmission system by means of a harmonic generating converter stage, in which the converter stage is supplied with an intermediate frequency signal modulated with the useful signal, and a local oscillator signal, a desired high frequency signal is provided at a first mixing diode with its desired level, a desired high frequency signal is provided at a second mixing diode with a level below its desired level and with a phase shift, the two high frequency signals are combined, and at least one high frequency signal is set such that the high frequency output signal produced by combining has a distorted component whose amplitude coincides with the amplitude of the distorted signal component introduced by the transmission member but whose phase is in phase opposition with the latter, in that at least two converters are provided, each including a respective mixing diode, the setting is carried out by supplying the converter containing the second diode with the local oscillator signal via a level and phase controller, and the combining is performed in a summing member.

DESCRIPTION OF THE PREFERRED EMBODIMENTS

Figure 1:
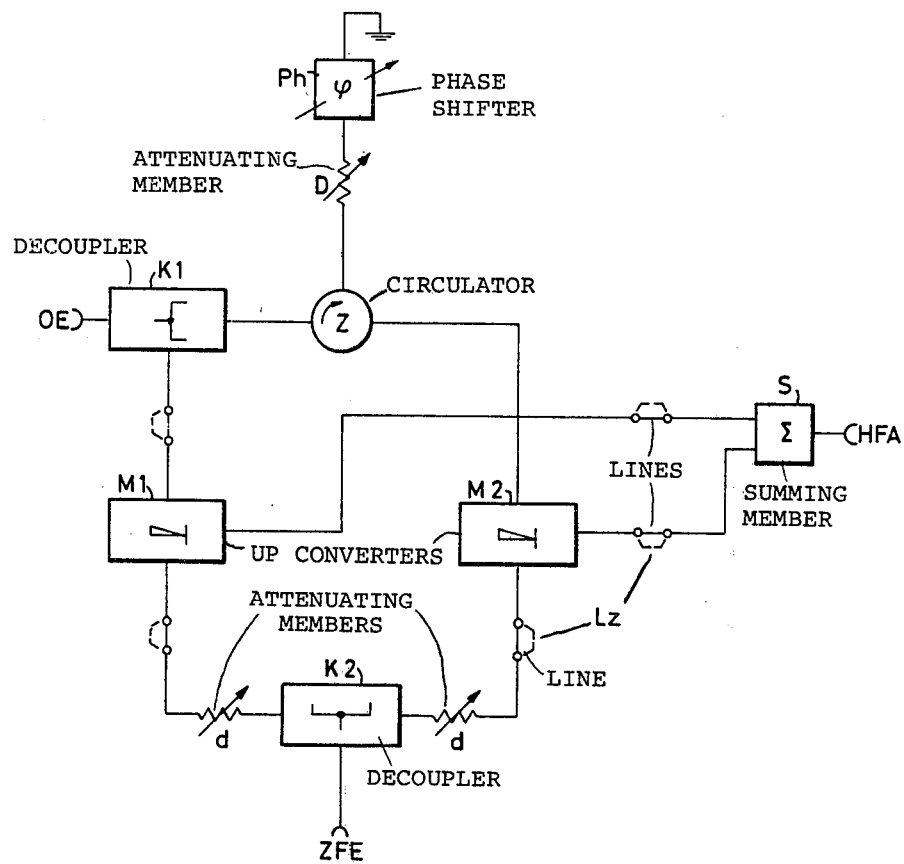
FIG. 1 is a block circuit diagram of a preferred embodiment of a converter stage according to the invention.

The converter arrangement according to the invention shown in FIG. 1 includes two up converters M1 and M2 which receive, via an input ZFE, a decoupler K2 and settable or permanently balanced attenuating members d, for example, a single sideband modulated intermediate frequency signal. A local oscillator signal is conducted via an input OE to a decoupler K1 whose one output is connected directly to an input of the first converter M1 and whose second output is connected to one arm of a three-arm circulator Z. The next following arm, when seen in the forward direction of circulation, is terminated by a settable or permanently balanced attenuating member D and a likewise permanently balanced or settable phase shifter Ph. Element Ph could be constituted, for example, by a stub line.

The third arm of the circulator Z, when seen in the forward direction of circulation, leads to an input of the second converter M2. The outputs of the two converters are combined in a summing member S at whose output HFA there appears the desired HF signal.

By suitably setting the attenuating members and the phase shifter, an interference signal of any amplitude and any phase position can be generated to correspond to a certain nonlinearity. To improve the broadband behavior of the circuit, it may be necessary, under certain circumstances, to include additional lines Lz in the converter branches, which may be advantageously coaxial or micro strip lines.

Thus it is possible with such a converter arrangement to generate a nonlinearity which coincides in amplitude and phase with that of another transmission member but is in phase opposition thereto and thus has a linearizing effect.

Figure 2:
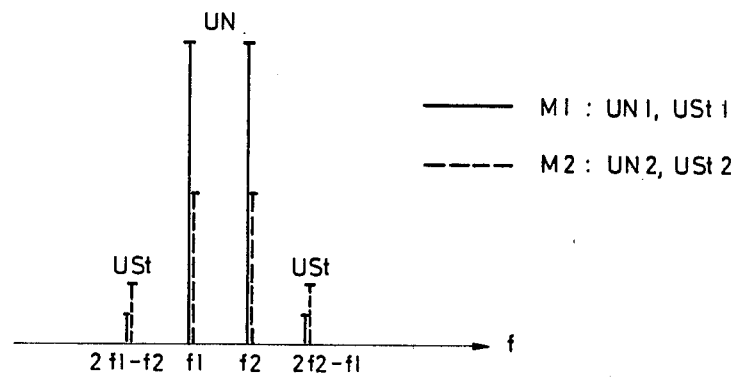
FIG. 2 is a frequency spectrum diagram illustrating the operation of the circuit of FIG. 1.

FIG. 2 illustrates several signal amplitude values as a function of frequency, f, showing one sideband of converter output for the converter arrangement of FIG. 1, if e.g. two-tone-method for measuring nonlinearities is applied. The signals shown include two useful signals UN at frequencies f1 and f2 and two distorted interference signals USt at frequencies 2f2-f1 and 2f1-f2, respectively, the solid lines corresponding to the output of the converter M1 and the broken lines to the output of converter M2. It can be seen very clearly that the converter M1 has a nonlinearity of only 10% but the converter M2, which operates at half power, has a nonlinearity of 20 or 40%, respectively, with respect to its power. The nonlinear interference signals are assumed to be in phase with the useful signals UN.

Figures 3A, 3B:
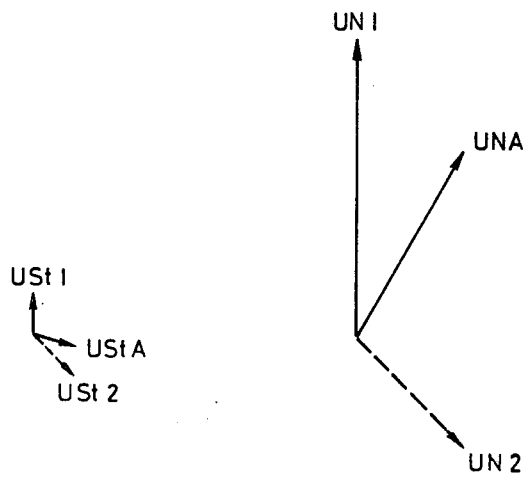
FIGS. 3a and 3b are signal phase diagrams illustrating the operation of the circuit of FIG. 1.

If now the phase shifter Ph of FIG. 1 is used to set a phase difference of approximately $\frac{3}{2}\pi$ between the signals from converter M1 and the signals from converter M2, the summing member S performs an addition, the result of which is shown in FIGS. 3a and 3b. FIG. 3a shows the output useful signal UNA formed of the components UN1 and UN2, while FIG. 3b shows the resulting nonlinear interference signal UStA formed of the two nonlinear interference signals USt1 and USt2, respectively, from the converters M1 and M2, respectively. It can be seen clearly that the resulting nonlinear interference signal lags behind the resulting useful signal by about $\pi/4$, which can be used to advantage for compensating a distortion factor resulting from AM/PM conversion in a traveling field tube which has a distortion factor that leads its useful signal by $\pi/4$.

A suitable commercially available up converter is Mod. No. 70 M7 from Anareen, for example. In principle each type of Schottky diodes may be used for mixing diode.

The couplers K1 and K2 are 3 dB-couplers, which are described in "A Method of Analysis of Fourport Networks", IRE, MTT, Oct. 1956, pp. 246–252, and are commercially available from Merrimac as Model No. M3A, respectively.

Summing member S is realised as a 6 dB-Interdigitated coupler, which is described in "Design More accurate Interdigitated couplers", Microwaves, May 1976, pp. 34–38, for example.

For attenuating members d and D may be used PIN-diodes, which are commercially available by Merrimac, Model ARE-1 and Anareen Model No. 60 367, respectively.

For phase shifter may be used a device like described in microwave journal, March 1979 pp. 48 and following or a variable shorted stub line.

For example frequencies may be 6,2 GHz of OE and 70±15 MHz at ZFE, frequency range of HFA from 5,9 to 6,4 GHZ.

Output level of UNA is about −15 dB in per tone, amplitudes of signals UN1 and UN2 depend on phase and amplitude of the distortion signal.

Establishing of the relative power levels and phases for converters M1 and M2 is done by adjusting the elements d, D and Ph, respectively.

It will be understood that the above description of the present invention is susceptible to various modifications, changes and adaptations; and the same are intended to be comprehended within the meaning and range of equivalents of the appended claims.

What is claimed is:

1. In a method for compensating, by means of a distortion converter stage, for a distorted signal component introduced into a high frequency output signal modulated by a useful signal, which component is introduced into the output signal by a transmission member in a radio relay transmission system, the distortion converter stage being provided with first and second mixing diodes, which method includes supplying the converter stage with an intermediate frequency signal modulated by the useful signal and with a local oscillator signal, mixing the modulated intermediate frequency signal and the local oscillator signal by means of the first mixing diode in a manner to produce a first high frequency signal having the same frequency as the output signal, modulated by the useful signal and having a selected power level, mixing the modulated intermediate frequency signal and the local oscillator signal by means of the second mixing diode in a manner to produce a second high frequency signal having the same frequency as the output signal, modulated by the useful signal, having a power level lower than the selected power level, and shifted in phase relative to the first high frequency signal, and combining the first and second high frequency signals in a manner to produce the high frequency output signal such that the output signal has a distorted component whose amplitude coincides with the amplitude of the distorted signal component introduced by the transmission member but whose phase is in phase opposition with the latter, the improvement wherein said steps of mixing are carried out by means of at least two converters each including a respective one of said mixing diodes, said method further comprises supplying the converter containing said second diode with the local oscillator signal via a level and phase controller, and said step of combining is performed in a summing member.

2. In a distortion converter circuit arranged to compensate for a distorted signal component introduced into a high frequency output signal modulated by a useful signal, which component is introduced into the output signal by a transmission member in a radio relay transmission system, which circuit includes means for supplying the converter circuit with an intermediate frequency signal modulated by the useful signal and with a local oscillator signal, a first mixing diode connected to the supplying means for producing a first high frequency signal having the same frequency as the output signal, modulated by the useful signal and having a selected power level, a second mixing diode connected to the supplying means for producing a second high frequency signal having the same frequency as the output signal, modulated by the useful signal, having a power level lower than the selected level, and shifted in phase relative to the first output signal, means for linking the first and second high frequency signals to produce the high frequency output signal, and means for setting at least one of the first and second high frequency signals such that the high frequency output signal produced by the linking means has a distorted component whose amplitude coincides with the amplitude of the distorted signal component introduced by the transmission member but whose phase is in phase opposition with the latter, the improvement wherein: said circuit comprises at least two converters each including a respective one of said mixing diodes; said setting means comprises a level and phase controller connected for supplying said converter containing said second diode with the local oscillator signal; and said linking means comprise a summing member.

3. A circuit as defined in claim 2 further comprising at least one adjustable attenuating member connected between said supplying means and one said converter for attenuating the intermediate frequency signal supplied to said one converter.

4. A circuit as defined in claim 2 or 3 wherein said level and phase controller comprises a three-armed circulator and an adjustable attenuating and phase member connected to one output of said circulator.

5. A circuit as defined in claim 4 wherein said phase member comprises a stub line.

* * * * *